(12) United States Patent
Hush et al.

(10) Patent No.: US 11,144,482 B1
(45) Date of Patent: Oct. 12, 2021

(54) BIDIRECTIONAL INTERFACE CONFIGURATION FOR MEMORY

(71) Applicant: Micron Technology, Inc., Boise, ID (US)

(72) Inventors: Glen E. Hush, Boise, ID (US); Richard C. Murphy, Boise, ID (US); Honglin Sun, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/866,689

(22) Filed: May 5, 2020

(51) Int. Cl.
  *G06F 13/16* (2006.01)
  *H04L 29/08* (2006.01)
  *H04L 12/40* (2006.01)
  *H04B 1/38* (2015.01)

(52) U.S. Cl.
  CPC ........... *G06F 13/1668* (2013.01); *H04B 1/38* (2013.01); *H04L 12/40* (2013.01); *H04L 69/323* (2013.01)

(58) Field of Classification Search
  CPC ... G06F 13/1668; H04L 12/40; H04L 69/323; H04B 1/38
  See application file for complete search history.

(56) References Cited

U.S. PATENT DOCUMENTS

| 5,050,095 | A | 9/1991 | Samad |
| 7,043,466 | B2 | 5/2006 | Watanabe et al. |
| 7,110,321 | B1 * | 9/2006 | Gibson ................ G11C 7/1006 365/189.02 |
| 7,249,213 | B2 | 7/2007 | Feng et al. |
| 7,827,319 | B2 | 11/2010 | Kimura et al. |
| 8,358,934 | B2 | 1/2013 | Hinderthuer et al. |
| 9,190,153 | B2 | 11/2015 | Nobunaga et al. |
| 10,498,523 | B1 * | 12/2019 | Wang .................... H04L 25/242 |
| 2004/0073764 | A1 | 4/2004 | Andreasson |
| 2005/0165970 | A1 * | 7/2005 | Ching ................. G06F 13/4072 710/1 |
| 2010/0235554 | A1 | 9/2010 | Chang et al. |
| 2011/0093632 | A1 | 4/2011 | Aue |
| 2014/0143470 | A1 * | 5/2014 | Dobbs ................. G06F 15/8038 710/308 |
| 2016/0203721 | A1 * | 7/2016 | Wright ................. B62D 15/027 348/118 |
| 2018/0181510 | A1 | 6/2018 | Liu |
| 2019/0027195 | A1 | 1/2019 | Kim et al. |

OTHER PUBLICATIONS

International Search Report and Written Opinion from related International Application Serial No. PCT/US2021/029547, dated Aug. 20, 2021, 9 pages.

\* cited by examiner

*Primary Examiner* — Henry Tsai
*Assistant Examiner* — Christopher A Daley
(74) *Attorney, Agent, or Firm* — Brooks, Cameron & Huebsch, PLLC (57) ABSTRACT

Apparatuses and methods can be related to configuring interface protocols for memory. An interface protocol can define the commands received by a memory device utilizing transceivers, receivers, and/or transmitters of an interface of a memory device. An interface protocol used by a memory device can be implemented utilizing a decoder of signals provided via a plurality of transceivers of the memory device. The decoder utilized by a memory device can be selected by setting a mode register of the memory device.

20 Claims, 6 Drawing Sheets

BIDIRECTIONAL INTERFACE CONFIGURATION FOR MEMORY

TECHNICAL FIELD

The present disclosure relates generally to memory, and more particularly to apparatuses and methods associated with configuring a bidirectional interface for memory.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

The memory may be provided command utilizing an interface protocol. The commands provided to the memory may be predefined and may be used to control the function of the memory.

DETAILED DESCRIPTION

The present disclosure includes apparatuses and methods related to configuring a bidirectional interface for memory. A memory device can include a plurality of transceivers, transmitters, and/or receivers. A memory device may receive a plurality of signals through a plurality of pins. For example, a memory device may receive commands, addresses, and/or data, among other signals, through the plurality of pins. As used herein, a plurality of pins physically couples a memory device to a computing system. The pins of a memory device are a physical interface that enables communication between the memory device and the computing system. The transceivers, transmitters, and/or receivers can be coupled to the physical interface (e.g., the pins of the memory device) such that the transceivers, transmitters, and/or receivers receive or transmit signals via the physical interface.

In various examples, a protocol may define the use of the transceivers, transmitters, and/or receivers. Such a protocol is described herein as an interface protocol. The interface protocol can define how the transceivers, transmitters, and/or receivers are used and/or what type of data is received through the transceivers, transmitters, and/or receivers. For example, the interface protocol can define that a first transceiver is used for commands, a second transceiver is used for addresses, and/or a third transceiver is used for data, among other uses of the transceivers. The interface protocol can also define whether the transceivers are used for directional or bidirectional data transfer.

The interface protocol defines the communications between a memory device and a device external to the memory device. Devices can be compliant to an interface protocol if they communicate as defined by the interface protocol. The interface protocol can be defined such that a memory device can receive and process signals from a plurality of devices external to the memory device, where the plurality of devices are manufactured by a plurality of different providers. An example of an interface protocol is the double data rate (e.g., DDR 5) standard, among other standards such as DDR4 or any other DDR standard. In various instances, the interface protocol can be generated by an organization such as the JEDEC that enables any devices complaint with the interface protocol to communicate with each other without the added expense of defining a new interface protocol for multiple devices.

An interface protocol can be limited in its ability to define communications between devices due to the limitations on the quantity of pins that a memory device can have and/or the hardware coupled to the quantity of pins such as the transceivers, transmitters, and/or receivers of the memory device. The hardware (e.g., transceivers, transmitters, and/or receivers) coupled to the pins can also define the directionality of the pins. In various instances, some of the pins may be configured to receive signals and not to transmit signals or may be configured to transmit signals and not receive signals. The hardware coupled to said pins may be configured to function as defined by an interface protocol. For example, pins that are configured to receive signals may be coupled to receives and not transmitters and/or transceivers.

In a number of examples, the directionality of an interface of a memory device can be overcome by implementing multiple interface protocols and by implementing hardware to enable the multiple interface protocols. As used herein, an interface can include buses, pins, and transceivers, transmitters, and/or receivers that couple a device to a different device. For example, an interface can include transceivers, transmitters, and/or receivers of a host, buses coupling a host to a memory device, pins of the memory device, and transceivers, transmitters, and/or receivers of the memory device. The multiple interface protocols can be implemented in a single device utilizing a same decoder and a plurality of multiplexers to reroute signals to different portions of the memory device.

Figure 1:
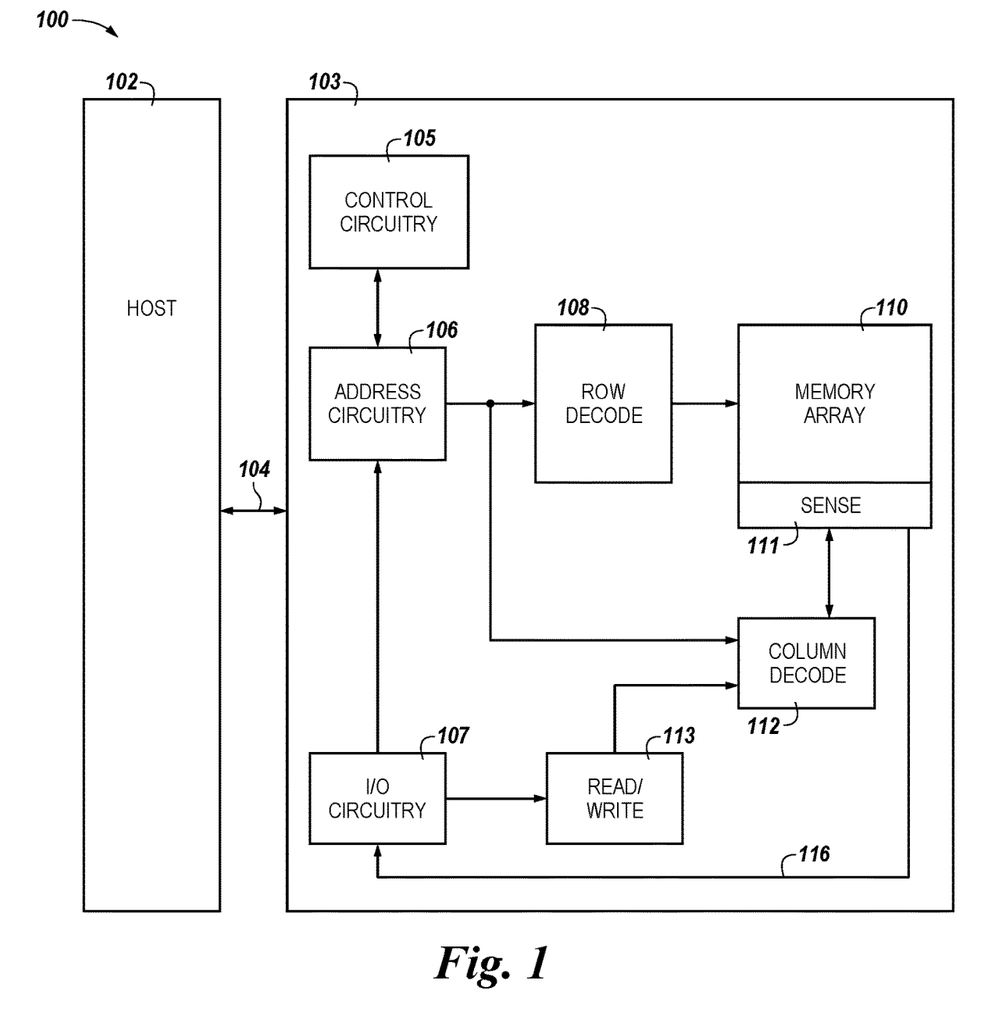
FIG. 1 is a block diagram of an apparatus in the form of a computing system including a memory device in accordance with a number of embodiments of the present disclosure.

FIG. 1 is a block diagram of an apparatus in the form of a computing system 100 including a memory device 103 in accordance with a number of embodiments of the present disclosure. As used herein, a memory device 103, a memory array 110, and/or a host 102, for example, might also be separately considered an "apparatus."

In this example, computing system 100 includes a host 102 coupled to memory device 103 via an interface 104. The computing system 100 can be a personal laptop computer, a desktop computer, a digital camera, a mobile telephone, a memory card reader, or an Internet-of-Things (IoT) enabled device, among various other types of systems. Host 102 can include a number of processing resources (e.g., one or more processors, microprocessors, or some other type of controlling circuitry) capable of accessing memory 103. The computing system 100 can include separate integrated circuits, or both the host 102 and the memory device 103 can be on the same integrated circuit. For example, the host 102 may be a system controller of a memory system comprising multiple memory devices 103, with the system controller 102 providing access to the respective memory devices 103 by another processing resource such as a central processing unit (CPU).

In the example shown in FIG. 1, the host 102 is responsible for executing an operating system (OS) and/or various applications that can be loaded thereto (e.g., from memory device 103 via control circuitry 105). The OS and/or various applications can be loaded from the memory device 103 by providing access commands from the host 102 to the memory device 103 to access the data comprising the OS and/or the various applications. The host 102 can also access data utilized by the OS and/or various applications by providing access commands to the memory device 103 to retrieve said data utilized in the execution of the OS and/or the various applications.

For clarity, the computing system 100 has been simplified to focus on features with particular relevance to the present disclosure. The memory array 110 can be a DRAM array, SRAM array, STT RAM array, PCRAM array, TRAM array, RRAM array, NAND flash array, and/or NOR flash array, for instance. The array 110 can comprise memory cells arranged in rows coupled by access lines (which may be referred to herein as word lines or select lines) and columns coupled by sense lines (which may be referred to herein as digit lines or data lines). Although a single array 110 is shown in FIG. 1, embodiments are not so limited. For instance, memory device 103 may include a number of arrays 110 (e.g., a number of banks of DRAM cells).

Figure 2:
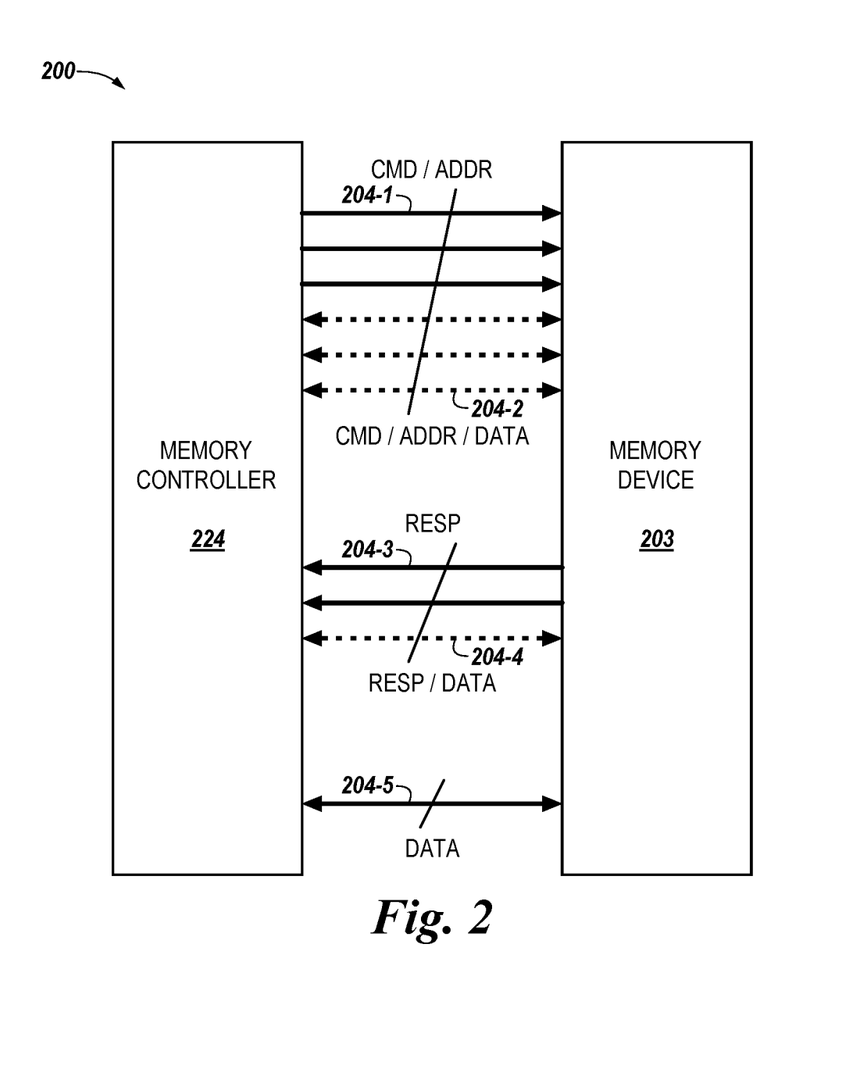
FIG. 2 is a block diagram of an apparatus in the form of a computing system including an interface in accordance with a number of embodiments of the present disclosure.
Figure 3A:
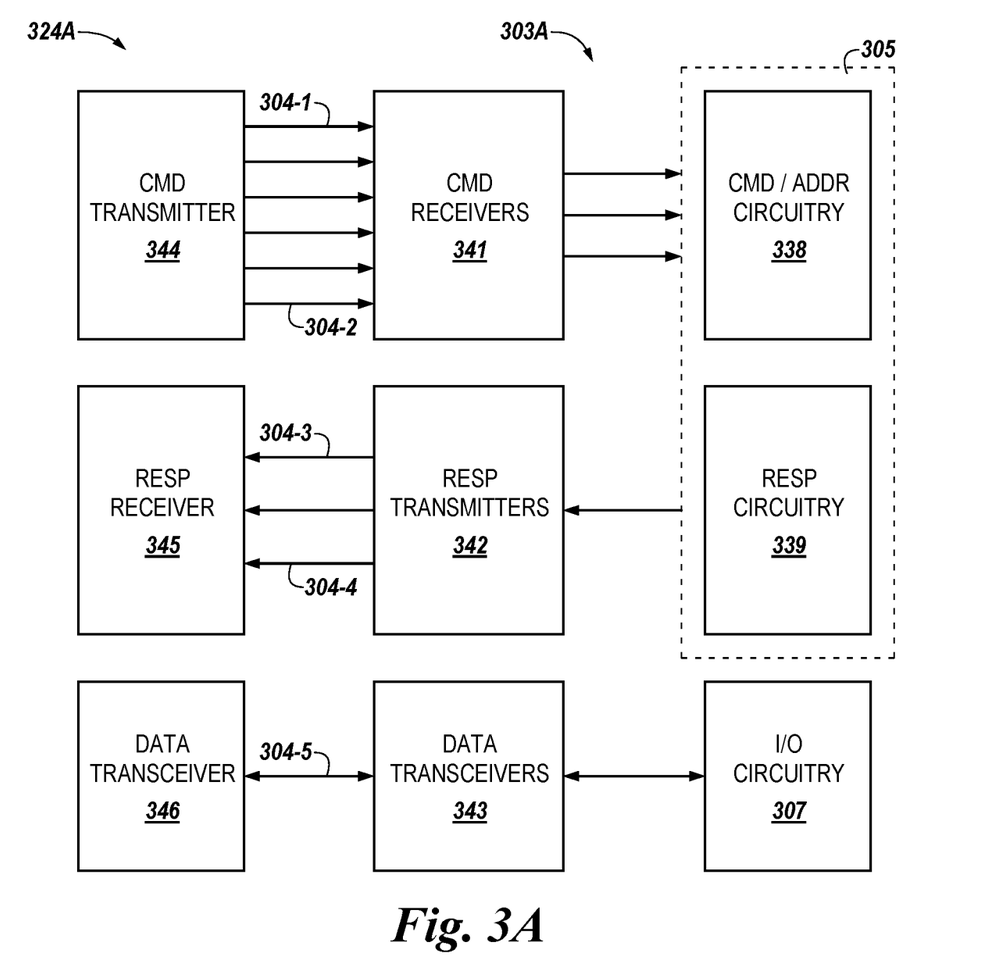
FIG. 3A is a block diagram of a memory device including a transmitter, a receiver, and a transceiver in accordance with a number of embodiments of the present disclosure.
Figure 3B:
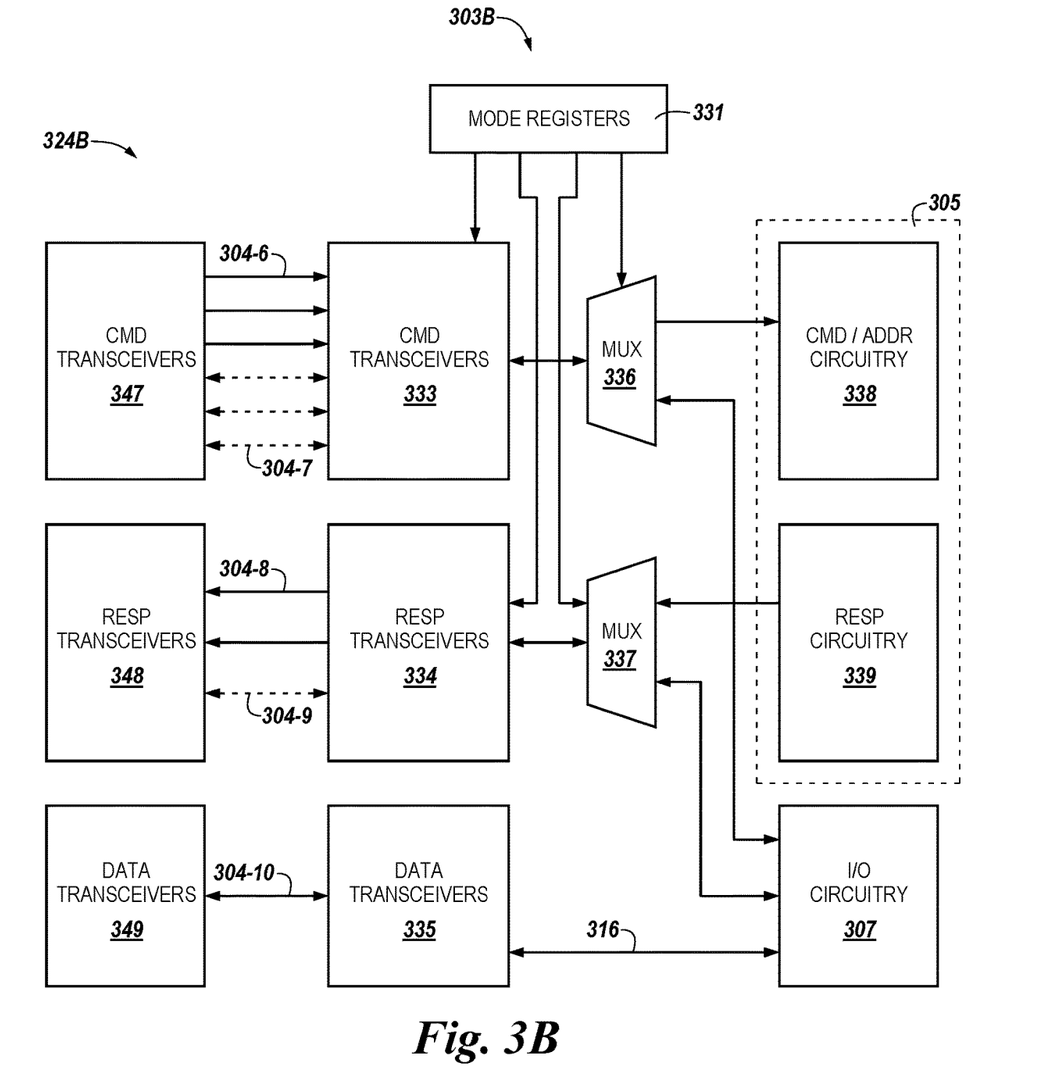
FIG. 3B is a block diagram of a memory device including a plurality of transceivers in accordance with a number of embodiments of the present disclosure.

The memory device 103 includes address circuitry 106 to latch address signals provided over an interface 104. The interface can include, for example, a physical interface employing a suitable protocol (e.g., a data bus, an address bus, and a command bus, or a combined data/address/command bus). The data bus, the address bus, and the command bus are shown in FIGS. 2, 3A, and 3B as interfaces 204 and 304, respectively. Such protocol may be custom or proprietary, or the interface 104 may employ a first interface protocol, which can be a standardized interface protocol, such as Peripheral Component Interconnect Express (PCIe), Gen-Z interconnect, cache coherent interconnect for accelerators (CCIX), or the like. In various examples, a standardized interface protocol can refer to an interface protocol that is defined in a standard. A non-standardized interface protocol (e.g., a second interface protocol) can refer to an interface protocol that is defined by a different standard or is not defined by a standard. Address signals are received and decoded by a row decoder 108 and a column decoder 112 to access the memory array 110. Data can be read from memory array 110 by sensing voltage and/or current changes on the sense lines using sensing circuitry 111. The sensing circuitry 111 can comprise, for example, sense amplifiers that can read and latch a page (e.g., row) of data from the memory array 110. The I/O circuitry 107 can be used for bi-directional data communication with the host 102 over the interface 104. The read/write circuitry 113 is used to write data to the memory array 110 or read data from the memory array 110. As an example, the circuitry 113 can comprise various drivers, latch circuitry, etc.

Control circuitry 105 decodes signals provided by the host 102. The signals can be commands provided by the host 102. These signals can include chip enable signals, write enable signals, and address latch signals that are used to control operations performed on the memory array 110, including data read operations, data write operations, and data erase operations. In various embodiments, the control circuitry 105 is responsible for executing instructions from the host 102. The control circuitry 105 can comprise a state machine, a sequencer, and/or some other type of control circuitry, which may be implemented in the form of hardware, firmware, or software, or any combination of the three. In some examples, the host 102 can be a controller external to the memory device 103. For example, the host 102 can be a memory controller which is coupled to a processing resource of a computing device. Data can be provided to the memory array 110 and/or from the memory array via the data lines 116.

In various examples, the control circuitry 105 can include command circuitry and/or address circuitry. The command circuitry and/or address circuitry can include one or more decoders configured to decode command signals and/or address signals. The command signals can comprise command provided to the memory device 103. The address signals can comprise addresses of the memory array 110. The control circuitry 105 can also include response circuitry which can include an encoder to encode response signals. In various examples, the control circuitry 105 can further the include I/O circuitry 107 which is shown in FIG. 1 as being external to the control circuitry 105. The I/O circuitry 107 can include encoders and decoders to encode and decode data signals provided to the memory device 103 and/or data signals provided by the memory device 103.

In various instances, the functionality of the memory device 103 can be controlled by the host 102. For examples, the host 102 can provide commands to the memory device 103 through the interface 104 to read the memory array 110 and/or write to the memory array 110, among other functionalities of the memory array 110. However, an interface protocol implemented may not define commands to control the functionality of the sensing circuitry 111 to perform operations.

FIG. 2 is a block diagram of an apparatus in the form of a computing system 200 including an interface in accordance with a number of embodiments of the present disclosure. The interface 204-1, 204-2, 204-3, 204-4, and 204-5, referred to as interface 204, can include hardware configured to facilitate the transfer of signals between devices such as a memory controller 224 and a memory device 203. The memory controller 224 can be incorporated in a host such as host 102 of FIG. 1.

The interface 204 can include a first portion 204-1, a second portion 204-2, a third portion 204-3, a fourth portion 204-4, and a fifth portion 204-5. The first portion 204-1 and the second portion 204-2 of the interface 204 can comprise a first bus. A third portion 204-3 and a fourth portion 204-4 of the interface 204 can comprise a second bus. A fifth portion 204-5 of the interface can comprise a third bus. The first bus can be configured to transfer signals comprising command signals and/or address signals to the memory device 203. As such, the first bus can include a command bus and/or an address bus. The second bus can be configured to transfer error signals (e.g., response signals). The third bus can be configured to transfer data stored by the memory device 203 or data to be stored by the memory device 203. As such, the third bus can include a data bus. The data transferred via the third bus can be stored in a memory array of the memory device 203. A bus can comprise a physical connection between a memory controller 224 incorporated in a host and a memory device 203.

An interface protocol, the implementation of which is not shown in FIG. 2, can be used to configure the first bus and the second bus as unidirectional. The first bus can provide signals from the memory controller 224 to the memory device 203. The second bus can provide signals from the memory device 203 to the memory controller 224. The third bus can be bidirectional. Bidirectionality can be achieved by implementing software/firmware and hardware capable of transmitting and receiving signals in the memory device 203 and the memory controller 224.

A different interface protocol, the implementation of which is shown in FIG. 2, can be used to configure the first bus, the second bus, and the third bus. The first bus can be configured such that the first portion of the interface 204-1 is unidirectional while the second portion of the interface 204-2 is bidirectional. The second bus can be configured such that the third portion of the interface 204-3 is unidirectional while the fourth portion of the interface 204-4 is bidirectional. The fifth portion of the interface 204-5 can remain bidirectional as configured by the different interface protocol and as provided by the implementation of the interface protocol.

The first portion of the interface 204-1 can be used to transfer command signals and/or address signals to the memory device 203. The second portion of the interface 204-2 can be used to transfer command signals, address signals, and/or data signals to and from the memory controller 224 and the memory device 203. The third portion of the interface 204-3 can be used to transfer response signals from the memory controller 224 to the memory device 203. The fourth portion of the interface 204-4 can be used to transfer response signals and/or data signals to and from the memory controller and the memory device 203. As used herein, response signals can include signals comprising a response to a command and/or address signal provided by the first bus or data signals provided by the third bus. As used herein, a response signal can include error signals describing errors encountered by the memory device 203, among other type of response signals. Response signals can also include signals to signify the completion of an operation performed by the memory device 203. For example, a response signal can signal the completion of a write operation to store data to a memory array of the memory device 203. The fifth portion of the interface 204-5 can transfer data signals to and from the memory controller 224 and the memory device 203.

The interface 204 can include a plurality of pins that couple the memory device 203 to a memory controller 224.

The pins of the interface 204 can be composed of metals such as copper, nickel, and/or gold, among other types of metals. The pins of the interface 204 can include top pins and bottom pins. The top pins and the bottom pins can include pins formed on either side of a circuit board and are not intended to limit the orientation of the pins on the memory device 203.

The pins of the interface 204 can include power (PWR) pins, ground (GND) pins, and signal pins, among other possible types of pins. The PWR pins can provide power to the memory device 203, the GND pins can provide a ground connection to the memory device 203, and the signal pins can provide signals to and from the memory device 203.

The command signals, address signals, response signals, and/or data signals can be referred to as commands, addresses, responses, and/or data. The memory device 203 can receive the commands, addresses, responses, and/or data via the interface 204. Although the examples provided in FIG. 2 describe two different implementations of two different interface protocols, a plurality of interface protocols can be implemented by updating the software/firmware and hardware of the memory controller 224 and/or the memory device 203. For example, three different interface protocols can be implemented to configure the interface 204.

Each of the interface protocols may not be compliant with any of the other interface protocols. For instance, a first interface protocol may not be compliant with a second interface protocol. For example, a first interface protocol may not be used to configure the memory controller 224 and the memory device 203 to provide data signals through the second portion of the interface 204-2 while the second interface protocol may be used to configure the memory controller 224 and the memory device 203 to provide data signals through the second portion of the interface 204-2. While memory device 203 may be configured with the second interface protocol, which is noncompliant with the first interface protocol, the memory device 203 may be operated in compliance with the first interface protocol by refraining from transmitting signals via the second portion of the interface 204-2.

As used herein, a first interface protocol and a second interface protocol can be compliant with each other if the pins as configured by either the first interface protocol or the second interface protocol have the same directionality. A first interface protocol and a second interface protocol can be noncompliant with each other if the pins as configured by the first interface protocol and the second interface protocol have different directionalities (e.g., directional vs. bidirectional). The first interface protocol and the second interface protocol can also be compliant with each other if the pins are configured to convey the same types of signals. For example, a first interface protocol and a second interface protocol may be noncompliant if under a first interface protocol a pin conveys control signals and under a second interface protocol the pin conveys control signals and data signals.

FIG. 3A is a block diagram of a memory device 303A including a transmitter 344, a receiver 345, and a transceiver 346 in accordance with a number of embodiments of the present disclosure. FIG. 3A includes an interface 304 comprising a first portion 304-1, a second portion 304-2, a third portion 304-3, a fourth portion 304-4, and a fifth portion 304-5. The interface 304 can couple the memory device 303A to a host or memory controller 324A. The memory device 303A can be configured utilizing a first interface protocol.

The portions of the interface 304-1 and 304-2 can be unidirectional such that the portions of the interface 304-1 and 304-2 receive signals but are incapable of transmitting signals. The portions of the interface 304-1 and 304-2 are coupled to receivers 341 configured to receive command/address signals. The receivers 341 can provide the signals received to command/address circuitry 338 of control circuitry 305. The command/address circuitry 338 can be configured to decode the signals (e.g., command signals and/or address signals). The control circuitry 305 can also include response circuitry 339 which can be configured to encode response signals. FIGS. 3A and 3B identify the command and/or address circuitry 338 and the response circuitry 339 as being incorporated in the control circuitry 305. However, the command and/or address circuitry 338 and the response circuitry 339 can be implemented external to the control circuitry 305.

The response signals can be transmitted by transmitter 342. The portions of the interface 304-3 and 304-4 can be unidirectional. The portion of the interface 304-5 can be bidirectional such that the transceiver 343 can transmit data signals and can receive data signals. The transceiver 343 can be coupled to the I/O circuitry 307 and can receive signals from data lines of the memory device 303A. In various examples, the command and/or address circuitry 338, the response circuitry 339, and/or the I/O circuitry 307 can include encoders and/or decoders to encode and/or decode signals provided by the interface 304. The interface 304, in at least one embodiment, can include the command receivers 341, the response transmitters 342, and the data transceivers 343. For example, the interface 304 can be described as including the command receivers 341, the response transmitters 342, and/or the data transceivers 343. The interface 304 can also be described as including the command transmitter 344, the response receiver 345, and/or the data transceiver 346.

The interface 304 can couple the memory device 303A to the memory controller 324A. For example, the portions of the interface 304-1 and 304-2 can couple a transmitter 344 of the memory controller 324A to the receiver 341 of the memory device 303A. The portions of the interface 304-3 and 304-4 can couple a receiver 345 of the memory controller 324A to the transmitter 342 of the memory device 303A. The portion of the interface 304-5 can couple the transceiver 346 of memory controller 324A to the transceiver 343 of the memory device 303A.

FIG. 3B is a block diagram of a memory device 303B including a plurality of transceivers 333, 334, 335, 347, 348, and 349 in accordance with a number of embodiments of the present disclosure. FIG. 3B includes an interface 304 comprising a sixth portion 304-6, a seventh portion 304-7, an eighth portion 304-8, a ninth portion 304-9, and a tenth portion 304-10. The interface 304 can couple the memory device 303B to a host or memory controller 324B.

The memory device 303B can differ from memory device 303A of FIG. 3A in that the memory device 303B implements a second interface protocol while the memory device 303A implements a first interface protocol. The memory device 303A can also differ from memory device 303B in that memory device 303B implements command transceivers 333 and 334 in place of the command receivers 341 and the response transmitters 342 shown in FIG. 3A, respectively. The memory devices 303A and 303B also differ from each other in that the receiver 341 and the transmitters 342 of FIG. 3A are coupled to the command and address circuitry 338 and the response circuitry 339 differently than the transceivers 333 and 334 of FIG. 3B are coupled to the command and address circuitry 338, the response circuitry 339, and the I/O circuitry 307.

Configuring the memory device 303B utilizing the second interface protocol can configure portions of the interface 304 as bidirectional that are configured as unidirectional utilizing the first interface protocol. For example, the portions of the interface 304-7 and 304-9 are configured as bidirectional for memory device 303B as opposed to the corresponding portions of the interface 304-2 and 304-4 of FIG. 3A which are configured as unidirectional for memory device 303A. To enable the bidirectional configuration, the memory device 303B can include transceivers 333 and 334 instead of receivers 341 and transmitters 342 as shown for memory device 303A. Similarly, the memory controller 324B can be enabled for the bidirectionality of the portions of the interface 304-7 and 304-9 by implementing transceivers 347 and 348 for memory controller 324B instead of transmitters 344 and receivers 345 for memory controller 324A.

The interface 304 corresponding to memory device 303B can be configured such that portions of the interface 304 do not change as compared to the interface 304 corresponding to the memory device 303A. For example, portions of the interface 304-6 and 304-8 which correspond to a first portion of a command bus and a second portion of a response bus can remain unidirectional corresponding to the portion of the interface 304-1 and 304-3. As such, various implementations can implement a combination of receivers and transceivers to couple the memory device 303B to the portions of the interface 304-6 and 304-7 as opposed to transceivers 333 as shown in association with memory device 303B. The interface 304 can also be described as including the command transceivers 347, the response transceivers 348, the data transceivers 349, the command transceivers 333, the response transceivers 334, and/or the data transceivers 335.

The transceivers 333 and 334 can be coupled to MUXs 336 and 337, respectively. The MUX 336 can couple the transceivers 333 to the command/address circuitry 338 and the I/O circuitry 307. The MUX 337 can couple the transceivers 334 to the response circuitry 339 and the I/O circuitry 307.

For example, the portion of the interface 304-6 can be coupled to the command/address circuitry 338 utilizing the MUX 336 as configured by an interface protocol. The portion of the interface 304-7 can be coupled to the command/address circuitry 338 and/or the I/O circuitry 307 utilizing the MUX 336 as configured by the interface protocol. Although not shown, a different interface protocol can be used to configure the MUX 336 to couple the portion of the interface 304-6 to the command/address circuitry 338 and/or the I/O circuitry 307 and couple the portion of the interface 304-7 to the command/address circuitry 338.

Coupling the portion of the interface 304-7 to the I/O circuitry 307 provides for the ability to conduct bidirectional communications given that the I/O circuitry 307 can provide data for transmitting. Transmitting data utilizing pins corresponding to the portions of the interface 304-7, 304-9, and 304-10 can result in a greater throughput of data as compared to transmitting data utilizing pins corresponding to the portion of the interface 304-10.

The particular configuration of the MUXs 336 and 337 can be controlled utilizing mode registers 331. The particular configuration of the transceivers 333 and 334 can also be controlled by the mode registers 331 such that the command transceivers 333, the response transceivers 334, the MUX 336, and the MUX 337 are coupled to the mode registers 331. As used herein, mode registers 331 can include registers (e.g., memory) that can be accessed external to a memory device 303B. The mode registers 331 can be set or reset utilizing commands provided through open pins of an interface protocol. For example, an interface protocol can define a pin as open such that commands not defined by the interface protocol can be provided through said open pin. Read or write commands provided to memory device 303B can be used to set or reset the mode registers 331.

In some examples, setting the mode registers 331 can be associated with selecting a first interface protocol while resetting the mode registers 331 can be associated with selecting a second interface protocol. Although the mode registers 331 are labeled, a single mode register 331 can be implemented. Implementing a plurality of mode registers 331 provides the ability to implement more than two interface protocols. The mode registers 331 can be configured to select interface protocols which can be used to configure the MUXs 336 and 337 and the transceivers 333 and 334. For example, responsive to setting the mode register 331, the MUXs 336 and 337 can couple particular transceivers 333, 334, and/or 335 of the interface 304 to the command/address circuitry 338, the response circuitry 339, and/or the I/O circuitry 307. Responsive to setting or resetting the mode register 331, the transceivers 333 and 334 can be configured to transmit or receive signals to accommodate multiple interface protocols.

The mode registers 331 can be set by a host including the memory controller 324B. For example, the memory device 303B can receive a command signal via the portion of the interface 304-6 to set the mode registers 331 to configure the memory device 303B utilizing an interface protocol. The memory controller 324B can also include memory configured to select an interface protocol. For example, the memory controller 324B can also include separate mode registers (e.g., not shown) to select an interface protocol. The interface protocol selected by the memory controller 324B can coincide with the interface protocol selected for the memory device 303B. For example, responsive to providing a command to set or reset the mode registers 331 to select an interface protocol, the memory controller 324B can set or reset memory internal to the mode register 324B or a host to select a corresponding interface protocol. As such, the memory internal to the memory controller 324B can also be used to control the transceivers 347, 348, and 349.

Figure 4:
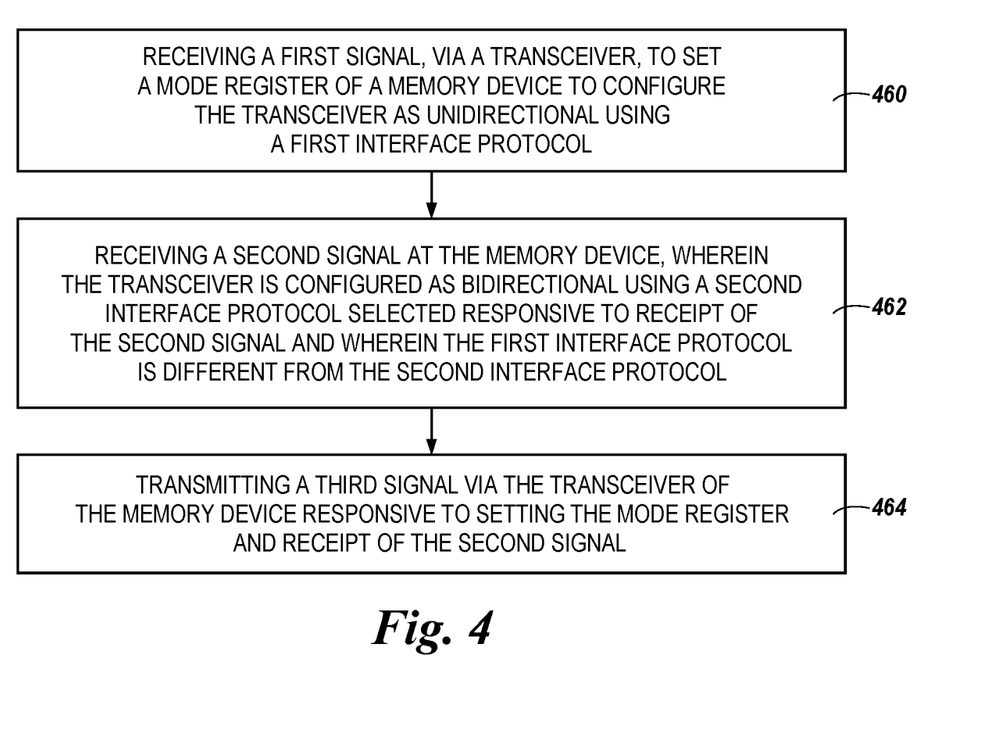
FIG. 4 illustrates an example flow diagram of a method for performing operations in memory in accordance with a number of embodiments of the present disclosure.

FIG. 4 illustrates an example flow diagram of a method for performing operations in memory in accordance with a number of embodiments of the present disclosure. At 460, a first signal can be received, via a transceiver, to set a mode register of a memory device to configure the transceiver as unidirectional using a first interface protocol. The first signal can be received from a host. The first signal can be received via a command bus, for example. At 462, a second signal can be received at the memory device, wherein the transceiver is configured as bidirectional using a second interface protocol selected responsive to receipt of the second signal and wherein the first interface protocol is different from the second interface protocol. In various instances, the second signal can be an access command, for example. The access command can be processed by the memory device. The second signal can be processed utilizing the second interface protocol responsive to the mode register being set.

At 464, a third signal can be transmitted via the transceiver of the memory device responsive to setting the mode register and receipt of the second signal. The third signal can be a response signal indicating that the second signal has been processed utilizing the second interface protocol. For example, the third signal can indicate completion of a command identified by the second signal.

The method can further include refraining from configuring a different transceiver responsive to receipt of the first signal. That is the different transceiver can function as unidirectional or bidirectional utilizing the first interface protocol and the second interface protocol. The different transceiver can also be configured responsive to receipt of the first signal, wherein the different transceiver is configured as unidirectional using the second interface protocol and the first interface protocol. Various of the transceivers, receivers, and transmitters may remain unchanged, as far as their configurations are concerned, regardless of whether a first interface protocol or a second interface protocol is implemented.

The different transceiver can be configured to receive and/or transmitting signals comprising commands, addresses, data, and/or or error signals responsive to implementing the second interface protocol. The different transceiver may be limited to receiving commands, addresses, data, or error signals or transmitting commands, addresses, data, or error signals responsive to implementing the first interface protocol.

In various examples, the configuring of transceivers is performed independently of the configuration of different transceivers utilizing the first interface protocol and the second interface protocol. For example, a memory device may refrain from configuring the different transceiver responsive to receipt of the first signal, where the different transceiver is configured as bidirectional regardless of whether the transceiver is configured as unidirectional or bidirectional.

In various instances, a mode register coupled to the memory device can be configured to implement set commands and cause the memory device to be operated according to a first interface protocol in a first mode in response to implementing a first set command. The mode register can also be configured to cause the memory device to be operated according to a second interface protocol in a second mode in response to implementing a second set command. A particular one of the transceivers can operate unidirectionally according to the first interface protocol. The particular transceiver can operate bidirectionally according to the second interface protocol.

The particular transceiver can be coupled to a command bus and can be configured to receive signals according to the first interface protocol and receive and transmit signals according to the second interface protocol. The signals can be received and transmitted via the command bus. The particular transceiver can be configured to receive and transmit data via a data bus. The particular transceiver can be configured to receive and transmit commands via the command bus. The particular transceiver can be configured to receive and transmit addresses via an address bus. The particular transceiver can be configured to receive and transmit signals representing errors via a pin of the memory device.

The memory device can also include a MUX coupled to the particular transceiver and configure to couple the particular transceiver to a particular decoder. For example, the multiplexer can further be configured to provide signals received from the first decoder to the particular transceiver responsive to the implementing of the first set command.

The multiplexer can also be coupled to the mode register. The multiplexer can also be configured to provide signals received via the particular transceiver to the first decoder responsive to the implementing of the first set command wherein the signals are provided without providing the signals to the second decoder. The multiplexer can also be configured to provide signals received from the particular transceiver to a second decoder and provide signals received from the second decoder to the particular transceiver responsive to the implementing of the second set command. The first set command can be used to select a first interface protocol and the second set command can be used to select the second interface protocol.

The multiplexor can provide signals received from the particular transceiver to the first decoder and provide signals received from the particular transceiver to the second decoder responsive to the implementing of the second set command. The multiplexor can also provide signals received from the second decoder to the particular transceiver responsive to the implementing of the second set command. The first interface protocol can be compliant to a standard and the second interface protocol may not be compliant to the standard. As such, the first interface protocol can be referred to as a compliant interface protocol and the second interface protocol can be referred to as a non-compliant interface protocol.

In various examples, a host can comprise a first transceiver and a device coupled to the first transceiver. The device can be configured to cause to be transmitted, via the first transceiver, a first signal to set a mode register of a memory device to configure a second transceiver of the memory device utilizing a second interface protocol. That is, the host can control which interface protocol is implemented in the memory device and the host. The same interface protocol can be selected in the host and the memory device to allow the host and the interface protocol to properly decode and encode signals utilizing a first interface protocol or a second interface protocol.

The host can cause the first transceiver configured with a first interface protocol to be configured utilizing the second interface protocol. The first transceiver can have been unidirectional prior to being configured and can be bidirectional after being configured. The first interface protocol is non-compliant with the second interface protocol. The host can also cause a second signal to be transmitted to the memory device utilizing the first transceiver and the second transceiver. The host can also cause a third signal to be received via the first transceiver responsive to transmitting the second signal, the first signal, and responsive to configuring the first transceiver. The first transceiver and the second transceiver can be coupled to the memory device of the host.

Figure 5:
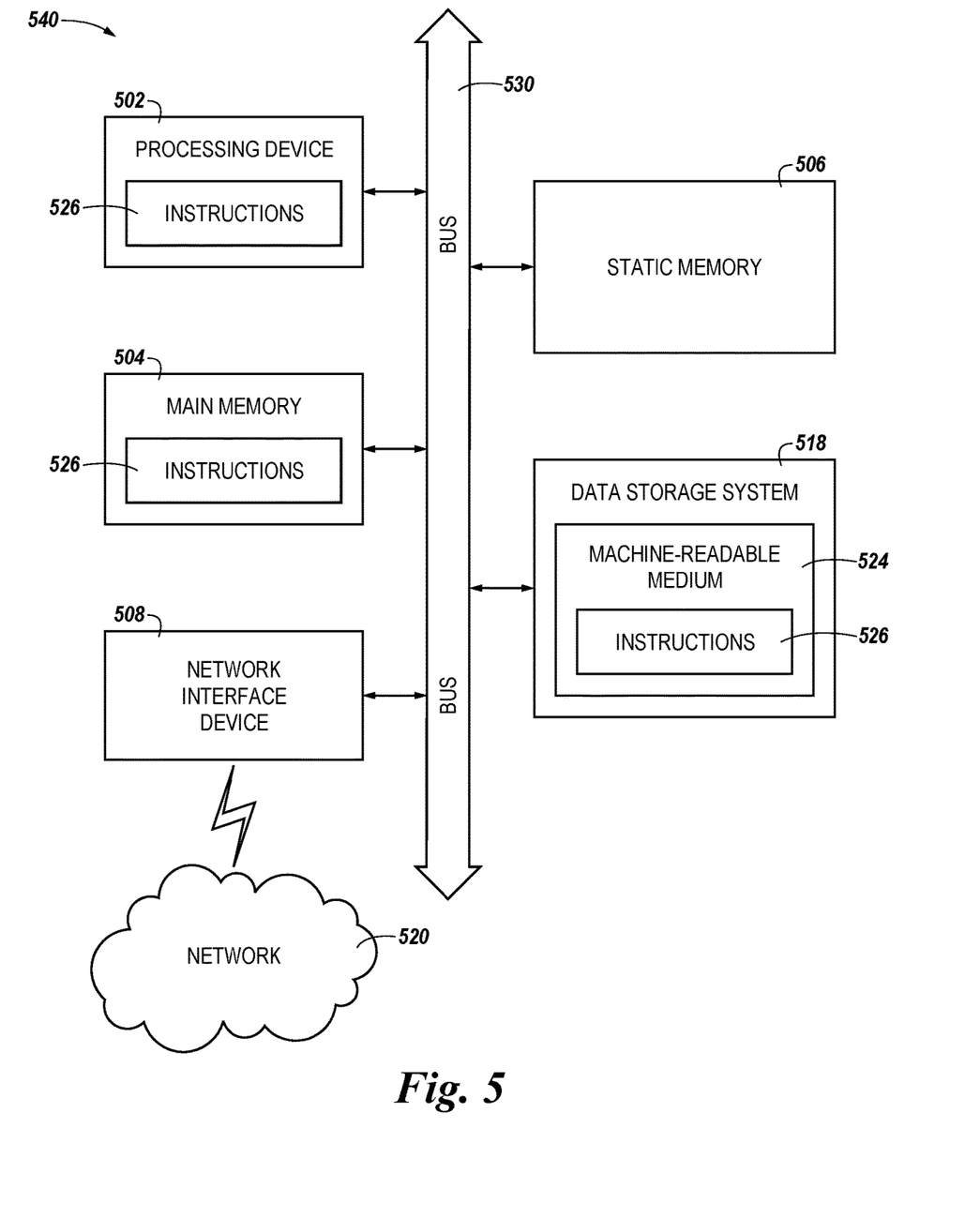
FIG. 5 illustrates an example machine of a computer system within which a set of instructions, for causing the machine to perform various methodologies discussed herein, can be executed.

FIG. 5 illustrates an example machine of a computer system 540 within which a set of instructions, for causing the machine to perform various methodologies discussed herein, can be executed. In various embodiments, the computer system 540 can correspond to a system (e.g., the computing system 100 of FIG. 1) that includes, is coupled to, or utilizes a memory sub-system (e.g., the memory device 103 of FIG. 1) or can be used to perform the operations of a controller (e.g., the control circuitry 105 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 540 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 540 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 540, the main memory 504 and the processing device 502 also constituting machine-readable storage media.

In one embodiment, the instructions 526 include instructions to implement functionality corresponding to the host 102 and/or the memory device 103 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory device including a plurality of transceivers; and
   a mode register coupled to the memory device, wherein the mode register is configured to:
   implement set commands;
   cause the memory device to be operated according to a first interface protocol in a first mode in response to implementing a first set command, wherein, according to the first interface protocol a particular one of the transceivers operates unidirectionally; and
   cause the memory device to be operated according to a second interface protocol in a second mode in response to implementing a second set command, wherein according to the second interface protocol the particular transceiver operates bidirectionally and the first interface protocol is noncompliant with the second interface protocol.

2. The apparatus of claim 1, wherein the particular transceiver is coupled to a command bus and is configured to:
   receive signals according to the first interface protocol; and
   receive and transmit signals according to the second interface protocol, wherein the signals are received and transmitted via the command bus.

3. The apparatus of claim 2, wherein the particular transceiver is configured to receive and transmit data via a data bus.

4. The apparatus of claim 2, wherein the particular transceiver is configured to receive and transmit commands via the command bus.

5. The apparatus of claim 2, wherein the particular transceiver is configured to receive and transmit addresses via an address bus.

6. The apparatus of claim 2, wherein the particular transceiver is configured to receive and transmit signals representing errors via a pin of the memory device.

7. The apparatus of claim 1, further comprising a multiplexer (MUX) coupled to the particular transceiver and configure to couple the particular transceiver to a particular decoder.

8. The apparatus of claim 7, wherein the multiplexer is further configured to provide signals received from the first decoder to the particular transceiver responsive to the implementing of the first set command.

9. The apparatus of claim 7, wherein the multiplexer is further coupled to the mode register and is further configured to provide signals received via the particular transceiver to the first decoder responsive to the implementing of the first set command wherein the signals are provided without providing the signals to the second decoder.

10. The apparatus of claim 9, wherein the multiplexer is further configured to provide signals received from the particular transceiver to a second decoder and provide signals received from the second decoder to the particular transceiver responsive to the implementing of the second set command.

11. The apparatus of claim 9, wherein the multiplexer is further configured to;
    provide signals received from the particular transceiver to the first decoder;
    provide signals received from the particular transceiver to the second decoder responsive to the implementing of the second set command; and
    provide signals received from the second decoder to the particular transceiver responsive to the implementing of the second set command.

12. The apparatus of claim 1, wherein the first interface protocol is compliant to a standard and the second interface protocol is not compliant to the standard.

13. A method comprising:
    receiving a first signal, via a transceiver, to set a mode register of a memory device to configure the transceiver as unidirectional using a first interface protocol;
    receiving a second signal at the memory device, wherein the transceiver is configured as bidirectional using a second interface protocol selected responsive to receipt of the second signal and wherein the first interface protocol is noncompliant with the second interface protocol; and
    transmitting a third signal via the transceiver of the memory device responsive to setting the mode register and receipt of the second signal.

14. The method of claim 13, further comprising refraining from configuring a different transceiver responsive to receipt of the first signal.

15. The method of claim 13, further comprising configuring a different transceiver responsive to receipt of the first signal, wherein the different transceiver is configured as unidirectional using the second interface protocol and the first interface protocol.

16. The method of claim 15, further comprising configuring the different transceiver to receive signals comprising commands, addresses, or error signals responsive to implementing the second interface protocol.

17. The method of claim 13, further comprising refraining from configuring a different transceiver responsive to receipt of the first signal, wherein the different transceiver is configured as bidirectional regardless of whether the transceiver is configured as unidirectional or bidirectional.

18. The method of claim 13, wherein the second signal is received via the transceiver and wherein the third signal indicates completion of a command identified by the second signal.

19. An apparatus, comprising:
a first transceiver;
a device coupled to the first transceiver and configured to:
cause to be transmitted, via the first transceiver, a first signal to set a mode register of a memory device to configure a second transceiver of the memory device utilizing a second interface protocol;
cause the first transceiver configured with a first interface protocol to be configured utilizing the second interface protocol such that the first transceiver was unidirectional prior to being configured and is bidirectional after being configured, and wherein the first interface protocol is noncompliant with the second interface protocol;
cause to be transmitted a second signal to the memory device utilizing the first transceiver and the second transceiver; and
cause a third signal to be received via the first transceiver responsive to transmitting the second signal, the first signal, and configuring the first transceiver.

20. The apparatus of claim 19, wherein the first transceiver and the second transceiver couple the memory device to the apparatus.

* * * * *